(12) United States Patent
Majewski et al.

(10) Patent No.: US 7,774,648 B2
(45) Date of Patent: Aug. 10, 2010

(54) MICROPROCESSOR SUPERVISION IN A SPECIAL PURPOSE COMPUTER SYSTEM

(75) Inventors: Joseph S. Majewski, Strongsville, OH (US); Mark E. Anglin, Wadsworth, OH (US)

(73) Assignee: Honeywell International Inc., Morristown, NJ (US)

( * ) Notice: Subject to any disclaimer, the term of this patent is extended or adjusted under 35 U.S.C. 154(b) by 599 days.

(21) Appl. No.: 11/743,566

(22) Filed: May 2, 2007

(65) Prior Publication Data

US 2008/0276132 A1    Nov. 6, 2008

(51) Int. Cl.
*G06F 11/00* (2006.01)

(52) U.S. Cl. .......................................... 714/23; 714/55

(58) Field of Classification Search .................. 714/23, 714/24, 28, 36, 47, 51, 55
See application file for complete search history.

(56) References Cited

U.S. PATENT DOCUMENTS

| | | | | |
|---|---|---|---|---|
| 5,792,201 | A * | 8/1998 | Causey et al. | 607/27 |
| 6,134,655 | A * | 10/2000 | Davis | 713/1 |
| 6,463,546 | B1 * | 10/2002 | Jeske et al. | 713/400 |
| 6,526,527 | B1 * | 2/2003 | Gall et al. | 714/55 |
| 6,883,123 | B2 * | 4/2005 | Hashimoto et al. | 714/55 |

FOREIGN PATENT DOCUMENTS

WO    0124006    4/2001
WO    0195110    12/2001

OTHER PUBLICATIONS

Intel, Intel PXA255 Processor Developer's Manual, 2 pages, Jan. 2004.
Intel, Intel PXA255 Processor with Intel XScale Technology, Product Brief, 4 pages, 2003.
Maxim Integrated Products, Maxim 3.0V/3.3V Adjustable Microprocessor Supervisory Circuits, 20 pages, 2003.

* cited by examiner

*Primary Examiner*—Dieu-Minh Le
(74) *Attorney, Agent, or Firm*—Crompton Seager & Tufte LLC

(57) ABSTRACT

Devices and methods for microprocessor supervision in a special purpose computer system are provided. One illustrative embodiment includes a first watchdog timer internal to the microprocessor and a second watchdog timer external to the microprocessor. In some cases, the internal watchdog timer may be initiated prior to or during the operating system startup and the external watchdog timer may be initiated after the operating system is up and running. The internal watchdog timer may have a relatively longer timer duration than the external watchdog timer, but is not required in all embodiments. In some embodiments, the internal watchdog timer may monitor the microprocessor's startup sequence and the internal watchdog timer and/or external watchdog timer may monitor the microprocessor when the operating system is up and running. If the microprocessor faults at any time during startup or while the operating system is up and running, the internal and/or external watchdog timer may trigger a microprocessor reset.

20 Claims, 5 Drawing Sheets

MICROPROCESSOR SUPERVISION IN A SPECIAL PURPOSE COMPUTER SYSTEM

FIELD

The present invention relates generally to special purpose computer systems, and more particularly, to microprocessor supervision for special purpose computer systems.

BACKGROUND

Unlike general-purpose computer systems, such as personal computers, special purpose computer systems are designed and used for specific applications. Special purpose computer systems can range from portable devices such as digital watches, MP3 players and cell phones, to stationary installations like traffic lights, factory controllers, building controllers such as HVAC controllers, security system controllers, and other types of application specific controllers or systems. Personal digital assistants (PDAs) or handheld computers are generally considered special purpose computer systems, even though they are more expandable in software terms. In some cases, special purpose computer systems may be completely encapsulated by or dedicated to the device or system that it controls.

Under some circumstances, special purpose computer systems, just like general purpose computer systems, may fault, which, in some cases, may lead to a failure of the operating system. Generally, in order to recover from such a fault, the computing system must be restarted to re-initialize the entire set of software and operating parameters in order to return to normal operation. For general purpose computer systems, this is often accomplished by human intervention, for example, by pressing a reset switch or cycling power to the computing system. However, special purpose computer systems are often not easily accessible for human intervention, or it is inconvenient to reset such systems.

In order to recover from a fault, many special purpose computer systems incorporate a mechanism for automatically recovering and restarting the computing system. Typically, a microprocessor supervision timer circuit, or a watchdog timer, is provided to monitor the microprocessor and provide for the automatic recovery. A typical watchdog timer is, in essence, a modified timer that has an input that is toggled by the microprocessor during normal operation to continually reset the timer. In many cases, the watchdog timer also includes an output so that if the timer times out (e.g. the timer value increments above a threshold value before being reset), usually because of a computing system fault, the watchdog timer can reset the microprocessor to re-initialize the operating system.

Many special purpose computer systems include a commercial off-the-shelf (COTS) operating system. However, COTS operating systems are generally provided in a non-modifiable binary format, which preclude the addition of watchdog timer software during the startup sequence. Additionally, COTS operating systems typically have relatively long startup times. These and other characteristics of many COTS, especially in combination with special purpose computer systems, has made it difficult to adequately monitor the microprocessor for faults that occur during operating system startup, and after the operating system is up and running during normal operation.

Therefore, it would be desirable to have microprocessor supervision for special purpose computer systems that could monitor the microprocessor during the often relatively long operating system launch sequence, as well as during normal operation.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to special purpose computer systems, and more particularly, to microprocessor supervision for special purpose computer systems. In one illustrative embodiment, a special purpose computer system includes a microprocessor, a first watchdog timer and a second watchdog timer. The first watchdog timer may be internal to the microprocessor and the second watchdog timer may be external to the microprocessor, but this is not required in all embodiments.

In some cases, an internal watchdog timer is initiated prior to or during the operating system startup sequence, and an external watchdog timer is initiated after the operating system is fully launched and up and running. The internal watchdog timer may have a relatively longer timer duration than the external watchdog timer, but this is not required in all embodiments. In some embodiments, the internal watchdog timer may be used to monitor the microprocessor's launch sequence, and the internal watchdog timer and/or external watchdog timer may be used to monitor the microprocessor after the operating system is up and running. If the microprocessor faults at any time during the operating system startup sequence, or while the operating system is up and running, the internal and/or external watchdog timer may trigger a microprocessor reset.

BRIEF DESCRIPTION

The invention may be more completely understood in consideration of the following detailed description of various illustrative embodiments of the invention in connection with the accompanying drawings, in which.

DETAILED DESCRIPTION

Figure 1:
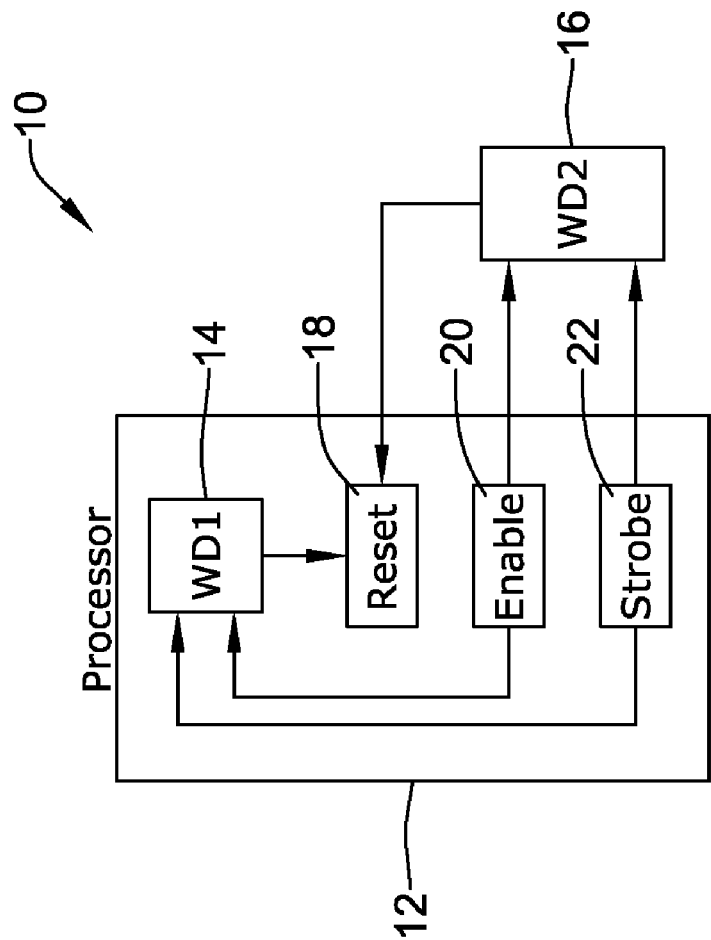
FIG. 1 is a block diagram of an illustrative special purpose computer system that includes two microprocessor watchdog timers.

The following description should be read with reference to the drawings wherein like reference numerals indicate like elements throughout the several views. The detailed description and drawings show several embodiments which are meant to be illustrative of the claimed invention.

The present invention relates generally to special purpose computer systems, and more particularly, to microprocessor supervision of special purpose computer systems. FIG. 1 is a block diagram of an illustrative special purpose computer system 10 that includes two watchdog timers 14 and 16. In the illustrative embodiment, the special purpose computer system 10 includes a processor 12, a first watchdog timer 14 internal to the processor 12, and a second watchdog timer 16 external to the processor 12. The illustrative internal watchdog timer 14 and the external watchdog timer 16 are timers that may be configured to monitor the operation of the processor 12. If the processor 12 faults, the internal watchdog timer 14 and/or the external watchdog timer 16 can reset the processor 12 to reinitiate the operating system.

In the illustrative embodiment, the processor 12 may execute a commercial off-the-shelf (COTS) operating system. One illustrative example of a COTS operating system is Microsoft Corporations Window CE™ operating system. Such COTS operating systems are generally provided in a non-modifiable binary format, which generally precludes the addition of watchdog timer strobe toggling software during startup. In some embodiments, the processor 12 may be, for example, a microprocessor or a microcontroller, depending on the application.

In the illustrative embodiment of FIG. 1, the processor 12 may include a strobe output 22, a reset input 18, and an optional enabling output 20. The strobe output 22 may be coupled to a strobe input of the internal watchdog timer 14 and a strobe input of the external watchdog timer 16. In some cases, the strobe output of the processor 12 may toggle the strobe inputs of the watchdog timers 14 and 16 between a logic high and a logic low value, as will be discussed in greater detail with reference to FIG. 3.

The optional enable output 20 may be coupled to an enable input of the internal watchdog timer 14, and/or an enable input of the external watchdog timer 16 when provided. In some cases, the processor 12 may have two enable outputs so that it can enable or initiate the internal watchdog timer 14 and the external watchdog timer 16 at different times. In one case, the internal watchdog timer 14 may be coupled to the processor 12 so that it is automatically enabled when the microprocessor is started. In this case, the external watchdog timer 16 may include an enable input coupled to the enable output 20 of the processor 12, and may be enabled at a time after the internal watchdog timer 14 is enabled, such as, for example, after the operating system has launched and is up and running.

The reset input 18 of the processor 12 may be coupled to an output, such as a reset output (not shown) of both the internal watchdog timer 14 and the external watchdog timer 16 when provided. The reset output of the internal watchdog timer 14 may be asserted when the internal watchdog timer's 14 timer times out and the external watchdog timer 16 may be asserted when the external watchdog timer's 16 timer times out. When the reset output of either the internal or the external watchdog timer 14 or 16 is asserted, the processor 12 may be reset and restarted (e.g. rebooted).

In operation, and in the illustrative embodiment of FIG. 1, the processor 12 may toggle the strobe input of the internal watchdog timer 14 and the external watchdog timer 16, indicating that the processor 12 is operating normally. In some cases, the toggle can be an intelligent toggle, or a toggle that is part of the operating system program. In the illustrative embodiment, toggling the strobe input of the watchdog timers 14 and 16 resets the time of each watchdog timer 14 and 16. If the processor 12 faults and fails to toggle the strobe input of the internal watchdog timer 14 and/or the external watchdog timer 16 for a sufficient length of time, and either or both of the internal watchdog timer 14 and/or the external watchdog timer 16 times out, the internal watchdog timer 14 and/or external watchdog timer 16 may trigger a processor reset via the reset input 18 of the processor 12.

In the illustrative embodiment of FIG. 1, the internal watchdog timer 14 may be enabled during the startup sequence of the operating system. In some cases, the internal watchdog timer 14 may be part of the processor 12 clocks/timers and may be enabled with like processor components during the initial processor 12 startup. When enabled at this time, the internal watchdog timer 14 may be able to monitor the processor during operating system startup. In some cases, the internal watchdog timer may have a programmable timer duration, which may provide greater flexibility to the watchdog timer 14 for having a relatively long or relatively short timer duration before reset, as desired.

In the illustrative embodiment, a COTS operating system, when used in conjunction with processor 12, is often provided in a non-modifiable form (e.g. binary executable form), and thus the incorporation of a software based watchdog timer may not be easily incorporated into the operating system. As such, and in some illustrative embodiments, the processor 12 may have an internal watchdog timer that is separate from the operating system. For example, processor 12 may have a software based internal watchdog 14 that is initiated by the BIOS or other locally stored program. Alternatively, processor 12 may have a hardware based internal watchdog timer 14, and/or a combination hardware/software internal watchdog timer 14. When the internal watchdog timer 14 includes a software component, it is contemplated that the enable, strobe and/or reset inputs and/or outputs discussed above may be implemented as software variables, rather than hardware I/O, if desired.

In the illustrative embodiment of FIG. 1, the internal watchdog timer 14 may be programmed or otherwise configured to have a relatively long timer duration. In some embodiments, the timer duration may be sufficiently long to allow for complete startup of the processor 12 operating system. For example, when using Microsoft Corporations Window CE™ operating system, which has a startup time typically in the range of about five minutes, the timer duration (e.g. timeout time) of the internal watchdog timer 14 may be about five minutes or more. In some cases, the timer duration of the internal watchdog timer 14 may be long enough to allow for complete startup of the operating system and then initialization of a watchdog timer toggling software utility after the operating system has booted up. Furthermore, it is contemplated that when using alternative operating systems, with different startup times, the internal watchdog timer 14 timer may have a suitable duration sufficiently long to allow the operating system to startup under normal startup conditions.

The external watchdog timer 16 may, in some cases, be a fixed-duration external watchdog timer 16, but this is not required in all embodiments. The external watchdog timer 16 may have a timer duration of, for example, tenths of seconds, seconds, tens of seconds, or longer as desired. In one illustrative case, the external watchdog timer 16 may have a timer duration of about 1-2 seconds. However, any suitable timer duration may be used, as desired.

In the illustrative embodiment, the external watchdog timer 16 may be enabled after the COTS operating system has started. In some cases, the external watchdog timer 16 may be enabled by the BIOS or other locally stored program of the processor 12. In other cases, the external watchdog timer 16 may be enabled by, for example, the COTS operating system itself, a watchdog timer software program loaded by the COTS operating system after the COTS operating system is up and running, or in any other suitable manner.

For some applications, the use of both an internal watchdog timer 14 and an external watchdog timer 16 may allow supervision of both the COTS operating system startup sequence and after the COTS operating system is up and running. In some cases, the internal watchdog timer 14 may provide startup supervision using a relatively longer watchdog timer timeout duration, and the external watchdog timer 16 may provide supervision under normal operating conditions with a relatively shorter watchdog timer timeout duration. Also, the use of both an internal watchdog timer 14 and an external watchdog timer 16 may provide some level of redundancy, which may result in increased reliability of the watchdog function, particularly when the internal watchdog timer 14 and the external watchdog timer 16 operate independent of one another.

Figure 2:
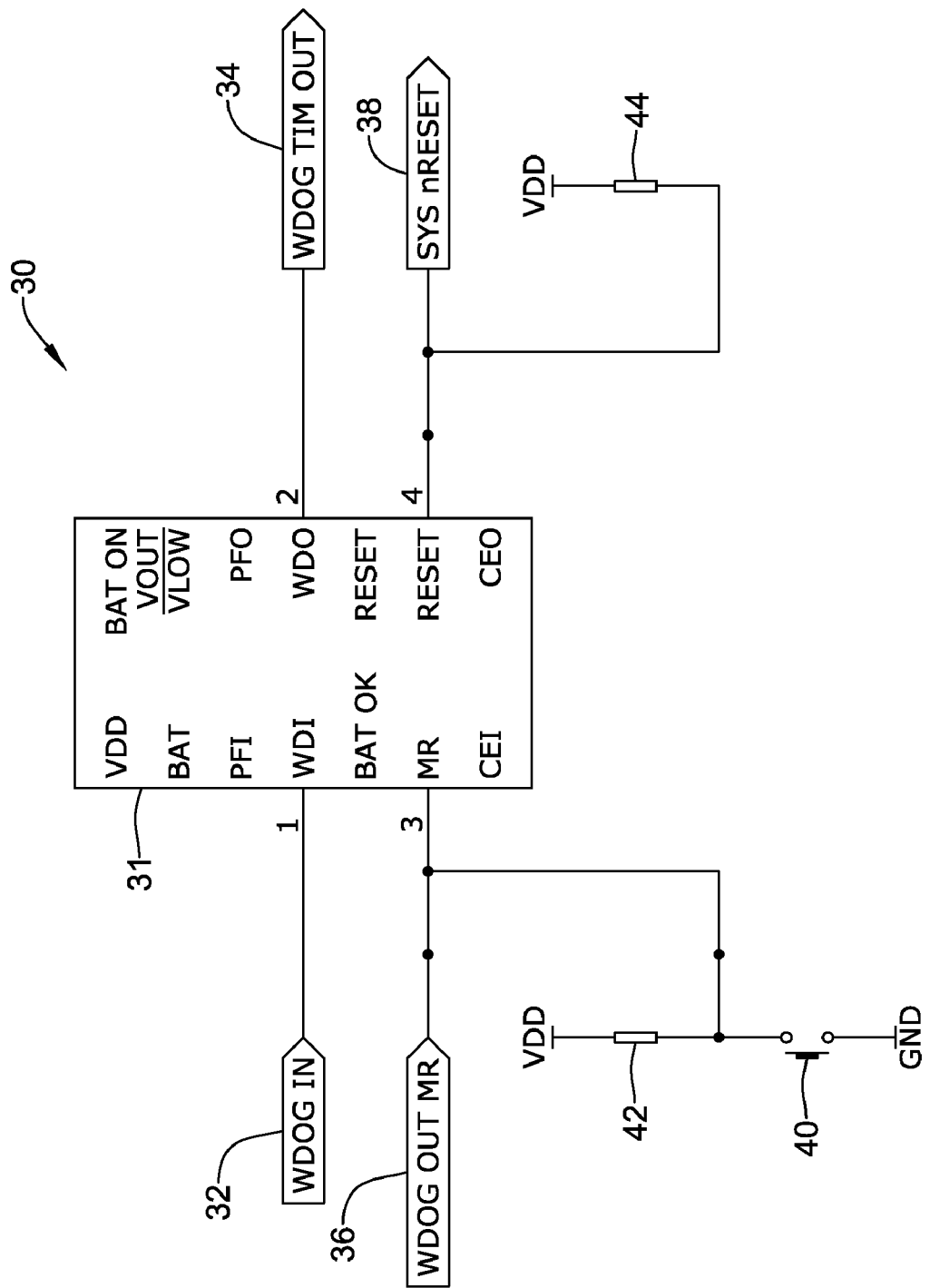
FIG. 2 is a schematic diagram of an illustrative microprocessor supervision circuit.

FIG. 2 is a schematic diagram of an illustrative embodiment of an example microprocessor supervision circuit 30. The illustrative microprocessor supervision circuit 30 may provide watchdog timer capabilities for a microprocessor (not shown). In some embodiments, the microprocessor supervision circuit 30 may also provide other features, such as, for example, back-up battery switchover, low-line voltage indication, write protection for RAM memory, as well as other functions, but this is not required. In the illustrative embodiment, the watchdog timer function of the microprocessor supervision circuit 30 may be performed using four pins. As illustrated, pin 1 may be a watchdog timer input (WDI) or strobe input, pin 2 may be a watchdog timer output (WDO), pin 3 may be a manual reset (MR), and pin 4 may be a reset output (RESET). WDI of pin 1 may be coupled to a watchdog timer input signal 32 from the microprocessor being monitored. In some cases, WDI may be the strobe input of the watchdog timer and the microprocessor may toggle the strobe input via the watchdog timer input signal 32. In operation, WDI may include a logic high and logic low state. Each time that WDI is toggled by the watchdog timer input signal 32, WDI may switch between logic high and logic low states. If WDI remains either high or low for a period of time that is longer than the watchdog timer duration, the controller 31 determines that the timer has timed out.

In the illustrative embodiment, the WDO of pin 2 may provide a watchdog timer time out signal 34. The watchdog timer time out signal 34 is indicative of whether the watchdog timer has timed out. In operation, WDO may be a logic high signal when the watchdog timer has not timed out. If the watchdog timer has timed out, WDO may go low. In essence, WDO goes low if WDI remains either high or low for longer than the watchdog timer timeout period. On the next transition of WDI, WDO may return high. In some embodiment, WDO, or the watchdog timer time out signal 34, may be connected to manual reset (MR) pin 3, or the watchdog timer out manual reset signal 36. In this configuration, the watchdog timer function of the supervision circuit 30 may generate a system reset at each operating system fault.

In the illustrative embodiment, the MR pin 3 may be coupled to a watchdog timer output manual reset signal 36. In some cases, MR may be an active-low input, but this is not required. In this case, it can be driven from a logic line voltage or shorted to ground with a switch 40. In operation, when WDO goes low, it pulls MR pin 3 low. A logic low on MR asserts the RESET pin 4. RESET pint 4 may remain asserted as long as MR is low. In some cases, RESET pin 4 may be asserted for a period of time after MR has switched to a logic high. For example, RESET pin 4 may be asserted for about 200 milliseconds after MR returns high, but this is not required.

In the illustrative embodiment, the RESET pin 4 may be coupled to a system reset signal 38 that may be coupled to a microprocessor reset input. When RESET pint 4 is asserted, the microprocessor under supervision may be reset or restarted. In some embodiments, RESET pin 4 may be an open-drain, active-low reset output. In some cases, it may pulse low for a period of time, such as, for example, 200 milliseconds, when asserted to indicate a system reset for the microprocessor under supervision. Additionally, RESET pin 4 may stay low whenever MR is a logic low. RESET pin 4 may remain low for a period of time, such as, for example, 200 milliseconds, after the watchdog timer triggers a reset or MR goes from low to high, but this is not required.

The illustrative microprocessor supervision circuit 30 may be incorporated into the embodiment of FIG. 1 as either the internal watchdog timer 14 or the external watchdog timer 16, or both. It is contemplated that the microprocessor supervision circuit 30 may have any suitable timer duration, as desired. Furthermore, the illustrative microprocessor supervision circuit 30 is merely illustrated and it is contemplated that any suitable watchdog timer or microprocessor supervision circuit may be used, as desired.

Figure 3:
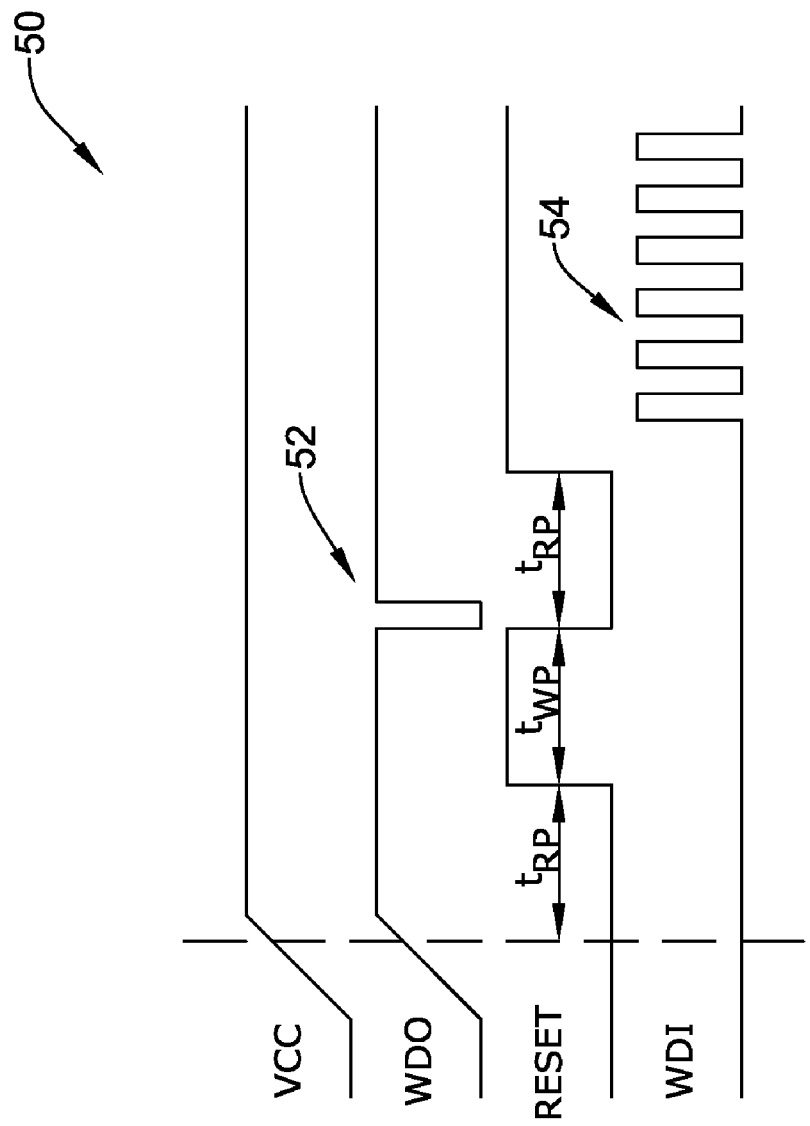
FIG. 3 is a timing diagram of the illustrative watchdog timer of FIG. 2.

FIG. 3 is an illustrative timing diagram 50 of the illustrative watchdog timer of FIG. 2 once the watchdog timer is enabled. In the illustrative embodiment, MR pin 3 may be connected to WDO pin 2 in order to have a system reset on every watchdog timer timeout fault. In this configuration, a watchdog timer fault occurs when the WDI pin 1 has not been toggled by the microprocessor under supervision within the timer's timeout duration. When the operating system is working properly, WDI may be toggled, switching between high and low states as indicated at 54. A watchdog timer fault is triggered when WDI pin 1 remaining a logic low or a logic high for a period of time that is longer than the timer's timeout duration.

When a watchdog timer faults occurs, or WDI pin 1 remained high or low for too long, WDO pin 2 goes low. With WDO connected to MR, when WDO goes low, it pulls MR low, causing a reset pulse to be issued. In some cases, for a period of time 52 after the reset is asserted, the watchdog timer may clear and WDO may return high. In the illustrative example, the period of time, illustrated by pulse 52, may be about ten microseconds, but this is not required. In some cases, the period of time 52 may result in a pulse at WDO, which may allow external circuitry to capture a watchdog timer fault indication.

In the illustrative embodiment, the reset pulse, indicated as $t_{RP}$, may last for a period of time. In one illustrative example, the reset pulse may be about 200 milliseconds, however, any suitable reset pulse length may be used as desired. Additionally, in the illustrative embodiment, the watchdog timer period, indicated as $t_{WP}$, may be the timeout duration of the watchdog timer. In some cases, the timer duration may be less than a second, one second, or more than one second, depending on the application. In the illustrative embodiment, the timer duration of the internal watchdog timer may be longer than the external watchdog timer. For example, the internal watchdog timer may have a timer duration of about five minutes and the external watchdog timer may have a timer duration of about one second, such as, about 1.6 seconds. However, it is contemplated that any suitable timer period may be used for the internal watchdog timer and the external watchdog timer, as desired.

Figure 4:
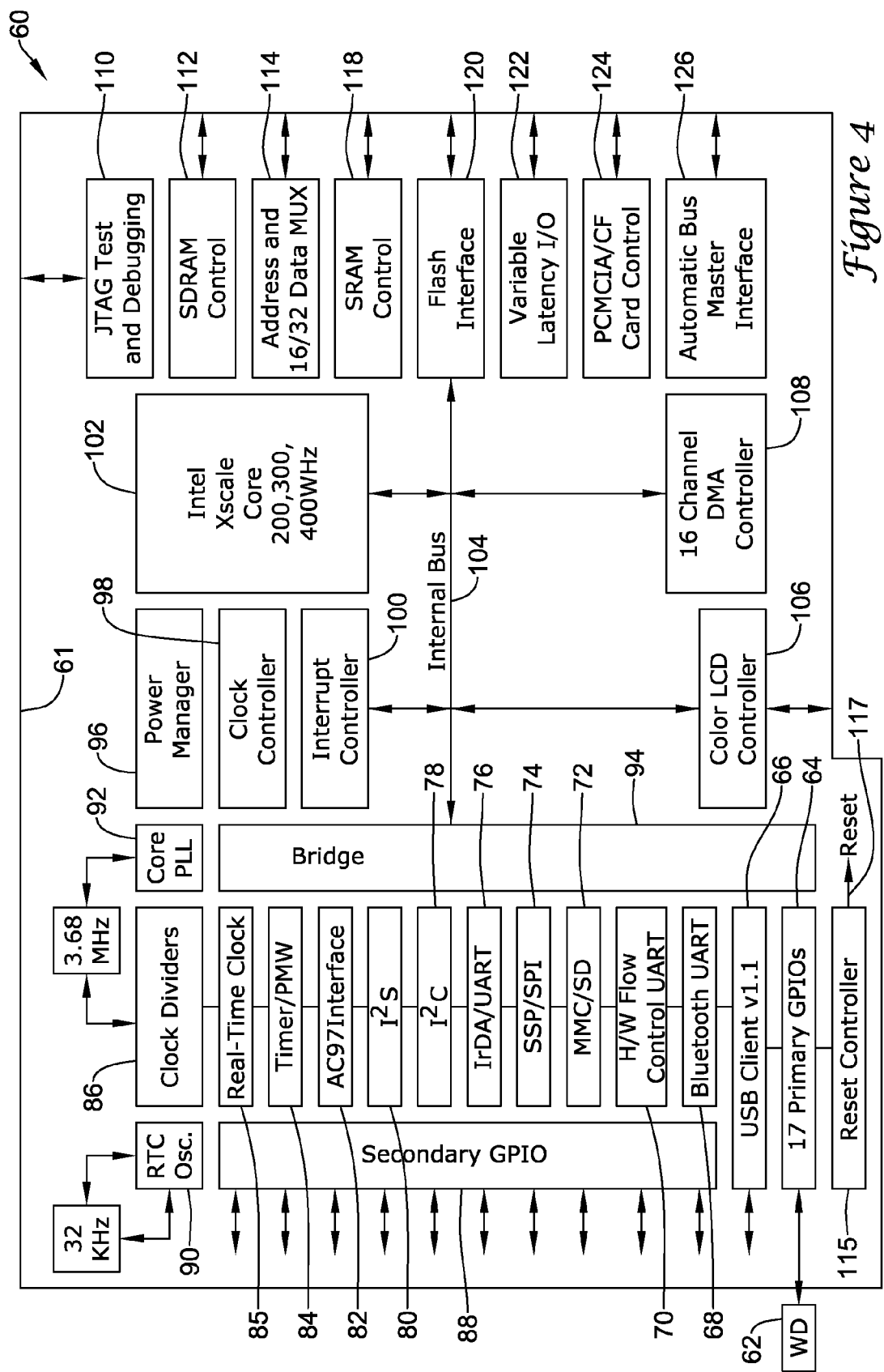
FIG. 4 is a block diagram of an illustrative special purpose computer system that includes a microprocessor and an external watchdog timer.

FIG. 4 is a block diagram of an illustrative embodiment of a special purpose computer system 60 including a microprocessor 61 under supervision and an external watchdog timer 62. In the illustrative embodiment, the microprocessor 61 under supervision may be an Intel® PXA255 Processor.

However, it is contemplated that any suitable microprocessor may be used, as desired. In the illustrative embodiment, the microprocessor 61 may include a COTS operating system. In one example, the Intel® PXA255 Processor may execute the Window CE™ 4.2 operating system. However, this is not meant to be limiting and it is contemplated that any suitable COTS operating system, or other operating system, may be used with any suitable microprocessor 61, as desired.

In the illustrative embodiment, the microprocessor 61 under supervision may include a processing core 102, a memory control module, a system control module, an internal bus 104, a peripheral control module, a bridge 94, as well as many other components. In the illustrative embodiment, the processing core 102 may be an Intel® Xscale™ core based CPU. In one embodiment, it may be a low-power, high-performance 32-bit Intel® Xscale™ core based CPU 200, 300, or 400 MHz. However, it is contemplated that any suitable processing core 102 may be used as desired.

In the illustrative microprocessor 61, the integrated memory controller may work on an internal memory bus 104, such as, for example, a 100 MHz memory bus. In some cases, the integrated memory controller may address either 16-bit or 32-bit ROM/Flash/SRAM (six banks) and 16-bit or 32-bit SDRAM/SMROM (four banks) via bus 104. In some cases, the memory controller may include a SDRAM controller 112, address and 16/32 bit data multiplexer 114, SRAM controller 118, Flash memory controller 120, variable latency I/O 122, a Personal Computer Memory Card International Association (PCMCIA or PC card)/compact flash (CF) controller 124, and automatic bus master interface 126. The SDRAM controller 112 may be coupled to external SDRAM, if provided. The SRAM controller 118 may be coupled to external SRAM, if provided. The Flash interface 120, such as, for example, a Burst Flash interface, may be coupled to external Flash memory, if provided. The PCMCIA/CF card controller 124 may be coupled to external PCMCIA or compact flash cards, if provided. Furthermore, it is contemplated that any suitable memory controllers and memory may be used, as desired.

In the illustrative embodiment, the system control module may include general purpose I/O (GPIO) ports, clocks and timers, dedicated controllers, and oscillators for the microprocessor 61 under supervision. As illustrated, there may be 17 dedicated primary GPIO ports 64, as well as secondary GPIO ports 88. The clocks and timers may include a real-time clock 85, an internal watchdog timer, and an interval timer (shown as timer/PWM 84). The dedicated controllers may include a power management controller 96, an interrupt controller 100, a reset controller 115, and a clock controller 98. In the illustrative embodiment, the reset controller 115 may be configured to reset the microprocessor 61 under supervision. In the illustrative embodiment, the reset controller 115 may have an input coupled to an Reset Output 117 that is response to the internal watchdog timer, so that when the internal watchdog timer (generally shown at 84) times out, the internal watchdog timer can reset the microprocessor 61. Also, in some cases, the illustrative system control module may include two oscillators, such as, for example, a 32 kilohertz real time clock oscillator 90 and a 3.68 megahertz core phase locked-loop (PLL) 92 coupled to a clock divider 86.

In the illustrative embodiment, the peripheral control module may include direct memory access (DMA) controller, liquid crystal display (LCD), serial, audio, universal serial bus (USB), and other interfaces. In some cases, the DMA controller 108 may be a 16 channel configurable DMA controller 108 that may allow certain hardware subsystems within the special purpose computer system 60 to access system memory for reading and/or writing independently of the core processor 102. The LCD interface may include an integrated color LCD controller 106 with unique DMA for fast color screen support. The serial interface may include an infrared data association (IrDA)/Universal Asynchronous Receiver/Transmitter (UART) 76, a H/W flow control UART 70 and a bluetooth UART 68. The audio interface may include an AC97 sound system 82. The USB interface 66 may be a USB end point interface. The other interfaces may include an I$^2$C 78, an I$^2$S 80, SPI and enhanced SSP 74, and MMC/SD card 72 interfaces.

A joint test action group (JTAG) test and debugging 110 module may be provided to monitor the execution of a program, write it, change it, or perform other debugging processes for the microprocessor 61, if desired. It should be recognized that the foregoing microprocessor 61 and components are merely illustrative, and it is contemplated that any suitable processor including any suitable components may be used as the processor under supervision, as desired.

The internal watchdog timer (generally shown at 84), provided with the clocks/timers of the microprocessor 61, may be a timer that has an output (e.g. either a hardware or software output) connected to the reset controller 115. As discussed previously, the internal watchdog timer may have a timer duration, and in some cases, a programmable timer duration. A programmable timer duration may allow for more flexibility, but is not required in all embodiments. For example, the internal watchdog timer may have a relatively short or a relatively long timer duration, as desired. In some cases, the timer duration of the internal watchdog timer may be programmed to correspond to a specific operating system.

In the illustrative embodiment, the internal watchdog timer may be programmed to have a relatively long timer duration. For example, the timer duration may be programmed to be sufficiently long enough to allow the illustrative Window CE™ 4.2 operating system to startup, which in some cases, may be about 5 minutes.

The internal watchdog timer may also have an enable input (e.g. a hardware enable input or software enable input) configured to enable the internal watchdog timer during the operating system startup sequence. After the internal watchdog timer is enabled, if the operating system faults and fails to boot up within the internal watchdog timer's timer duration, the internal watchdog timer may timeout and trigger a system reset via the Reset Controller 115 to reset the microprocessor 61.

Once the operating system has started up, and, in some cases, loaded a toggling software utility, the operating system and/or toggling software utility may toggle the strobe input of the internal watchdog timer, thereby resetting the watchdog timer with each strobe. In some cases, the internal watchdog timer may continue to monitor the microprocessor 61 after the operating system has started up and during subsequent operation. In this case, the internal watchdog timer may still have a relative long timer duration.

An external watchdog timer 62 may also be provided. In some cases, the external watchdog timer 62 may be used to monitor the operation of the microprocessor 61 after startup. In some cases, the external watchdog timer 62 may be a fixed-duration timer, but this is not required in all embodiments. In the illustrative embodiment, the external watchdog timer may have a relatively shorter timer duration as compared to the internal watchdog timer, which may be less than a second, a second, or more than a second, as desired. Also, the external watchdog timer may include an enable input to enable the external watchdog timer, a strobe input (similar to WDI of FIGS. 2 and 3), and a reset output (similar to RESET of FIGS. 2 and 3). The enable input and the strobe input may be coupled to the one or more of the primary GPIOs 64 of the microprocessor 61, which may enable the external watchdog timer 62 and toggle the strobe input of the external watchdog timer 62 when the microprocessor 61 is operating properly. The reset output may be coupled to the reset controller 115 to reset the microprocessor 61 when the operating system faults.

In some cases, after the operating system has started up, the microprocessor 61 may load a watchdog timer toggling software utility, and then send a signal to enable to external watchdog timer 62. Once enabled, under normal operating conditions (e.g. in the absence of a fault), the operating system may periodically toggle the strobe input of the external watchdog timer 62 to reset the external watchdog timer's 62 timer. If the operating system faults, the watchdog timer strobe input may not be toggled causing the external watchdog timer 62 timer to timeout. When the watchdog timer's 62 timer times out, the external watchdog timer 62 may assert the reset output coupled to the reset controller 115 and trigger a microprocessor 61 reset. After the external watchdog timer 62 is enabled, the internal watchdog timer and the external watchdog timer 62 may provide independent and redundant supervision over microprocessor 61.

Figure 5:
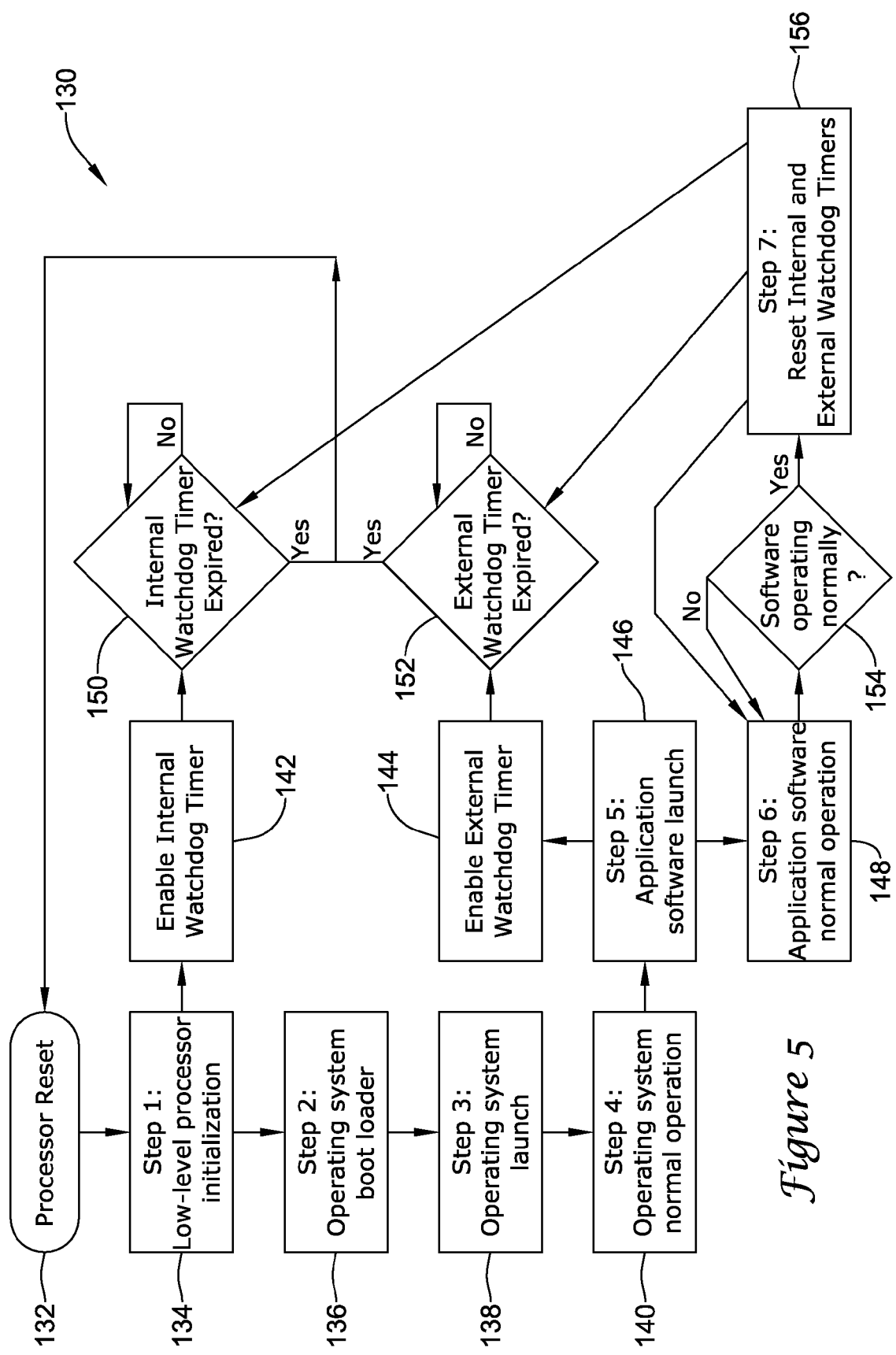
FIG. 5 is a logic diagram of an illustrative method of operating the special purpose computer system of FIG. 4.

FIG. 5 is a logic diagram 130 of an illustrative method of operating the special purpose computer system of FIG. 4. After the microprocessor 61 has been reset 132, in step 1, the microprocessor 61 may initialize basic internal peripherals or low-level processor functions 134 to begin the startup sequence. For example, basic microprocessor internal peripherals may include, but are not limited to, clocks, memory controllers, busses, and the like. In this initial step, the internal watchdog timer (generally shown at 84 in FIG. 4), being one of the microprocessor clocks/timers, is enabled 142. Once the internal watchdog timer is enabled, the internal watchdog timer continues to check to see if its timer has time out (i.e. expired) 150. If at any time, the timer expires, the internal watchdog timer may trigger a processor reset as shown at 132.

In the illustrative embodiment, the internal watchdog timer duration may be a relatively longer timer duration that may be sufficiently long to allow for full operating system startup under normal operating conditions. In some cases, the timer duration of the internal watchdog timer may be about 5 minutes, however, it is contemplated that any suitable timer duration may be used, as desired.

After the microprocessor has initiated the low-level processor function, and as shown at step 2, the operating system boot loader is started 136. In this step, the operating system may be loaded from slow executing flash memory to faster executing RAM. In some cases, the boot loader may also vector the operating system's launch/startup software.

Next, and as shown at step 3, the operating system may be launched 138. This may include the operating system startup software initializing and starting the operating system's task scheduler and kernel. In this step, the software may also launch the device drivers for the platform. In the illustrative embodiment, the operating system may be a COTS operating system, such as, for example, Windows CE™. Once launched, and as shown in step 4, the operating system may be running and may enter its normal operating mode 140.

Next, and as shown at step 5, as an initial task in the normal operating mode, the operating system may initiate the launch of application software for the special purpose computer system 146. The application software launch sequence may start up application specific software for the platform. During or after the application specific software is launched, the external watchdog timer 62 may be enabled, as shown at 144. If at any time, the timer of the external watchdog timer expires as shown at 152, the external watchdog timer triggers a processor reset as shown at 132.

After both the internal and external watchdog timers are initiated as shown at step 6 149, and during normal operation, the application software has a software supervisory utility or module that monitors whether all (or some) software tasks are operating normally 154. If the application software is operating normally, the microprocessor 61 toggles both the internal and external watchdog timers to reset the timers as shown at 156. However, if there is a problem detected by the software supervisory module, such as a fault, the software supervisory module omits toggling the internal and/or external watchdog timer circuits. If the internal and external watchdog timers are not toggled causing the timers to expire as shown at 150 and 152, the external and/or internal watchdog timer(s) trigger a processor reset as shown at 132. Additionally, if the application software is non-functional to the point where the software supervisory module is not operating, the external and/or internal watchdog timer(s) will expire triggering a processor reset.

The foregoing flow chart, including the startup sequence, is merely illustrative. It is contemplated that any suitable microprocessor or microprocessor startup sequence may be used, and in some cases as shown, the internal watchdog timer is enable prior to or during the operating startup sequence and the external watchdog timer is enabled after the operating startup sequence is complete.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A special purpose computer system, comprising:
    a microprocessor having an operating system;
    an internal watchdog timer internal to the microprocessor, the microprocessor toggling the internal watchdog timer and if the microprocessor does not toggle the internal watchdog timer for a first timer duration, the internal watchdog timer causes the microprocessor to reset;
    an external watchdog timer external to the microprocessor, the microprocessor toggling the external watchdog timer and if the microprocessor does not toggle the external watchdog timer for a second timer duration, the external watchdog timer causes the microprocessor to reset; and
    wherein the first timer duration is longer than the second timer duration.

2. The special purpose computer system of claim 1 wherein, upon startup, the operating system takes an operating system launch time period to achieve normal operation, and wherein the first timer duration is equal to or greater than the operating system launch time period.

3. The special purpose computer system of claim 2 wherein the internal watchdog timer has an enable and the external watchdog timer has an enable, wherein the internal watchdog timer is enable before the operating system achieves normal operation.

4. The special purpose computer system of claim 3 wherein the internal watchdog timer is enabled by a low level processor initialization routine.

5. The special purpose computer system of claim 4 wherein the low level processor initialization routine is initiated before the operating system is launched.

6. The special purpose computer system of claim 3 wherein the external watchdog timer is enabled after the operating system is launched and achieves normal operation.

7. The special purpose computer system of claim 6 wherein the external watchdog timer is enabled by an application software utility, and wherein the application software utility is launched after the operating system is launched and achieves normal operation.

8. The special purpose computer system of claim 1 wherein the operating system is a commercial off-the-shelf operating system (COTS).

9. The special purpose computer system of claim 1 wherein the first timer duration is programmable.

10. The special purpose computer system of claim 1 wherein the second timer duration is fixed.

11. A special purpose computer system, comprising:
 a microprocessor including a commercial off-the-shelf operating system (COTS), a strobe output, and a reset input, wherein the reset input resets the microprocessor;
 an internal watchdog timer internal to microprocessor, the microprocessor toggling the internal watchdog timer and if the microprocessor does not toggle the internal watchdog timer for a first timer duration, the internal watchdog timer causes the microprocessor to reset;
 an external watchdog timer including a strobe input coupled to the strobe output of the microprocessor, a reset output coupled to the reset input of the microprocessor, and a timer having a second timer duration, wherein the microprocessor toggles the external watchdog timer and if the microprocessor does not toggle the external watchdog timer for a period that is greater than or equal to the second timer duration, the external watchdog timer asserts the reset output causing the microprocessor to reset; and
 wherein the first timer duration is different than the second timer duration.

12. The special purpose computer system of claim 11 wherein the internal watchdog timer includes an enable, and wherein the microprocessor is configured to enable the internal watchdog timer prior to or during a period where the commercial off-the-shelf operating system (COTS) is launched.

13. The special purpose computer system of claim 11 wherein the external watchdog timer includes an enable, and wherein the microprocessor is configured to enable the external watchdog timer after the commercial off-the-shelf operating system (COTS) is launched and up and running.

14. The special purpose computer system of claim 11 wherein the microprocessor launches one or more applications after the commercial off-the-shelf operating system (COTS) is launched and up and running, and the external watchdog timer is enabled by one or more of the applications.

15. The special purpose computer system of claim 11 wherein one or more of the applications causes the microprocessor to toggle the external watchdog timer.

16. The special purpose computer system of claim 11 wherein the first timer duration is longer than the second timer duration.

17. A method for supervising a microprocessor of a special purpose computer system, comprising:
 launching an operating system of the microprocessor, the operating system taking an operating system launch time to fully launch and achieve normal operation;
 enabling a first watchdog timer prior to or during the launching step, the first watchdog timer having a first timer duration that causes the first watchdog timer to expire after the operating system launch time, the microprocessor toggling the first watchdog timer and if the microprocessor does not toggle the first watchdog timer prior to the expiration of the first timer duration, the first watchdog timer causing a microprocessor reset;
 enabling a second watchdog timer after the launching step, the second watchdog timer having a second timer duration that is shorter than the first timer duration, the microprocessor toggling the second watchdog timer and if the microprocessor does not toggle the second watchdog timer prior to the expiration of the second timer duration, the second watchdog timer causing a microprocessor reset; and
 causing a microprocessor reset if the first watchdog timer or the second watchdog timer expires.

18. The method of claim 17 wherein the first watchdog timer is internal to the microprocessor.

19. The method of claim 18 wherein the second watchdog timer is external to the microprocessor.

20. The method of claim 17 wherein the operating system is a commercial off-the-shelf operating system (COTS).

* * * * *